(12) United States Patent
de la Barré et al.

(10) Patent No.: US 10,116,927 B2
(45) Date of Patent: Oct. 30, 2018

(54) METHOD FOR REPRODUCING IMAGE INFORMATION AND AUTOSTEREOSCOPIC SCREEN

(71) Applicant: FRAUNHOFER-GESELLSCHAFT ZUR FÖRDERUNG DER ANGEWANDTEN FORSCHUNG E.V., München (DE)

(72) Inventors: René de la Barré, Mittweida (DE); Silvio Jurk, Berlin (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 509 days.

(21) Appl. No.: 14/431,289

(22) PCT Filed: May 7, 2013

(86) PCT No.: PCT/EP2013/001383
§ 371 (c)(1),
(2) Date: Mar. 25, 2015

(87) PCT Pub. No.: WO2014/048512
PCT Pub. Date: Apr. 3, 2014

(65) Prior Publication Data
US 2015/0256818 A1    Sep. 10, 2015

(30) Foreign Application Priority Data

Sep. 26, 2012   (DE) .................. 10 2012 217 440

(51) Int. Cl.
*H04N 13/31*      (2018.01)
*H04N 13/317*     (2018.01)
(Continued)

(52) U.S. Cl.
CPC .......... *H04N 13/31* (2018.05); *G02B 27/2214* (2013.01); *H04N 13/317* (2018.05); *H04N 13/324* (2018.05)

(58) Field of Classification Search
CPC ........... H04N 13/0415; H04N 13/0409; H04N 13/0422; G02B 27/2214; G09G 3/003; G09G 2300/023
See application file for complete search history.

(56) References Cited

U.S. PATENT DOCUMENTS

2008/0239482 A1   10/2008  Fukushima et al.
2009/0123030 A1*   5/2009  De La Barre ...... H04N 13/0409
                                                    382/103
(Continued)

FOREIGN PATENT DOCUMENTS

EP    2040478 A2   3/2009
EP    2296029 A1   3/2011

OTHER PUBLICATIONS

International Preliminary Examination Report issued in PCT/EP2013/001383, completed Mar. 31, 2015, 10 pages.

*Primary Examiner* — Temesghen Ghebretinsae
*Assistant Examiner* — Ivelisse Martinez Quiles
(74) *Attorney, Agent, or Firm* — Faegre Baker Daniels LLP

(57) ABSTRACT

A method for reproducing image information on an autostereoscopic screen including a pixel matrix and an optical grid, in which a period length defined by a lateral offset of adjacent strip-shaped structures of the optical grid is greater by a certain factor than a lateral offset of directly adjacent columns of the pixel matrix. The method including the steps of assigning an angle value and a location coordinate value to each of the specified columns, for each of the columns, calculating an extract of an image by image synthesis, wherein this image is a parallel projection of a 3D scene to (Continued)

be reproduced having a projection direction corresponding to the angle value assigned to the respective column, and controlling the pixels of the pixel matrix in such a way that each of the columns has written into it the extract calculated for this column.

20 Claims, 9 Drawing Sheets

(51) Int. Cl.
*H04N 13/324* (2018.01)
*G02B 27/22* (2018.01)

(56) References Cited

U.S. PATENT DOCUMENTS

| | | | |
|---|---|---|---|
| 2010/0295928 A1* | 11/2010 | De La Barre | G02B 27/2214 348/51 |
| 2011/0122236 A1* | 5/2011 | Yamada | G02B 27/2214 348/55 |
| 2012/0200677 A1 | 8/2012 | Saishu et al. | |
| 2012/0229610 A1 | 9/2012 | Fukushima et al. | |

\* cited by examiner

US 10,116,927 B2

METHOD FOR REPRODUCING IMAGE INFORMATION AND AUTOSTEREOSCOPIC SCREEN

CROSS-REFERENCE TO RELATED APPLICATIONS

This application is a national phase application of PCT Application No. PCT/EP2013/001383, internationally filed May 7, 2013, which claims priority to German Application No. 10 2012 217 440.0, filed Sep. 26, 2012, both of which are herein incorporated by reference in their entirety.

TECHNICAL FIELD

The disclosure relates to a method for reproducing image information on an autostereoscopic screen and to an autostereoscopic screen suitable for carrying out this method.

BACKGROUND

Some autostereoscopic screens are referred to as multiview displays. Such a screen has a pixel matrix with a plurality of pixels and also an optical grid arranged in front of the pixel matrix. The pixels of the pixel matrix are arranged such that they form a plurality of columns arranged equidistantly side by side with a column direction that is vertical or inclined relative to a vertical, wherein the optical grid has a group of strip-shaped structures oriented parallel to the columns and arranged equidistantly side by side and gives light originating from the pixels at least one defined propagation plane, which is spanned from a defined horizontal propagation direction and the column direction. In the case of an autostereoscopic screen of this type, a period length of the optical grid, said period length being defined by a lateral offset of adjacent strip-shaped structures, is greater by a factor $n \times L_n/(L_n+a)$ than a lateral offset of the directly adjacent columns, wherein "a" denotes an effective distance between the pixel matrix and the optical grid, $L_n$ denotes a nominal viewing distance of the autostereoscopic screen, and n denotes an integer greater than two. The distance "a" in the terminology selected is denoted as effective distance because the optical grid has a finite depth, which in some circumstances is also true for the pixels of the pixel matrix. The value of the effective distance can therefore be determined in some circumstances with absolute precision by evaluating the optical properties of the screen, such as by analysing a position of what are known as the viewing zones.

In some uses of such multiview screens, the columns of pixels are distributed in cyclical order from left to right between n sub-quantities, wherein one of n stereoscopic fields of image is then reproduced on each of these n sub-quantities. Due to the above-mentioned correlation between the period length of the optical grid and the lateral offset of the columns of pixels, the geometric properties of the screen then cause n viewing zones arranged side by side to be provided at the nominal viewing distance $L_n$ in front of the screen, from each of which viewing zones one of the fields of image is visible. The screen can be dimensioned such that a lateral offset of the directly adjacent viewing zones is approximately the same size as or insignificantly larger than the distance between both eyes of an average pair of eyes. The lateral offset of adjacent viewing zones, however, may also be much smaller in some circumstances and for example may correspond to half or a quarter of the distance between the eyes. The stereoscopic fields of image are now selected so as to be complementary to one another, such that the wholly or partially visible fields of image supplement one another in each case to form a stereo image. The fields of image each reproduce the same scene to be reproduced and differ from one another only by different parallaxes. Any viewer who places themself in front of the screen such that their eyes are located within a region spanned by the viewing zones, moreover in two different viewing zones, can thus perceive the scene autostereoscopically—that is to say without further aids—in a manner that appears to be three dimensional.

However, the region from which the reproduced scene can be perceived three-dimensionally is very limited, such as to a relatively narrow distance region around the mentioned nominal viewing distance. As soon as the viewer leaves the specified region, such as when the distance of the viewer from the screen deviates more than just slightly from the nominal viewing distance, the three-dimensional impression is lost or is at least falsified, and in any case the image quality becomes considerably poorer.

SUMMARY

This disclosure describes a method for reproducing image information on a screen that allows the reproduced scene to be perceived three-dimensionally autostereoscopically with the best possible quality from the greatest possible region, within which a viewer is to move freely within the greatest possible limits. In addition, the disclosure describes an autostereoscopic screen that enables an image reproduction meeting these requirements.

BRIEF DESCRIPTION OF THE DRAWINGS

Exemplary embodiments of the disclosure will be explained hereinafter on the basis of FIGS. 1 to 9, in which.

DETAILED DESCRIPTION

Figure 1:
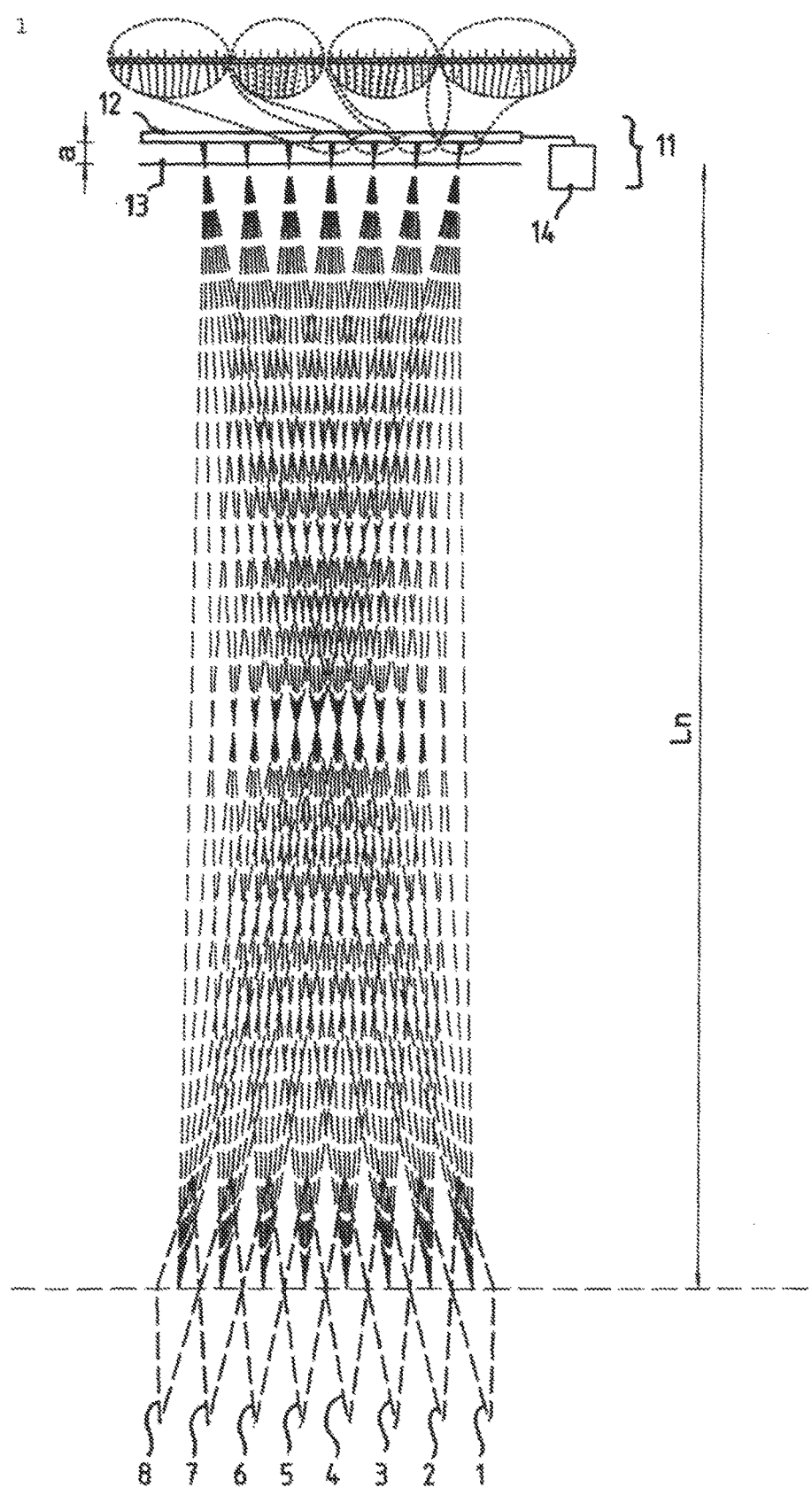
FIG. 1 shows a schematic view of an autostereoscopic screen and a viewer space in front of this screen with conventional control of the screen.

The disclosure describes a method for reproducing image information on an autostereoscopic screen, which has a pixel matrix with a plurality of pixels and also an optical grid arranged in front of the pixel matrix, wherein the pixels of the pixel matrix are arranged such that they form a plurality of columns arranged equidistantly side by side with a column direction that is vertical or inclined relative to a vertical, and wherein the optical grid has a group of strip-shaped structures oriented parallel to the columns and arranged equidistantly side by side and gives light originating from the pixels at least one defined propagation plane, which is spanned from a defined horizontal propagation direction and the column direction, wherein a period length of the optical grid, said period length being defined by a lateral offset of adjacent strip-shaped structures, is greater by a factor $n \times L_n/(L_n+a)$ than a lateral offset of the directly adjacent columns, wherein "a" denotes an effective distance between the pixel matrix and the optical grid, $L_n$ denotes a nominal viewing distance of the autostereoscopic screen, and n denotes an integer greater than two, which can be much greater than two, for example eight or more. The method comprises the following steps:

assigning an angle value and a location coordinate value to each of the specified columns, wherein the angle value is defined as a measure for an angle between a horizontal reference direction and the horizontal propagation direction or one of the horizontal propagation directions which is or are given to the light originating from the pixels of the respective column by the optical grid, and wherein the location coordinate value specifies a position, in the lateral direction, of the respective column or of the strip-shaped structure of the optical grid, through which the light originating from the pixels of this column falls, for each of the columns calculating an extract of an image by image synthesis, wherein this image is a parallel projection of a 3D scene to be reproduced having a projection direction that is defined by the angle corresponding to the angle value assigned to the respective column, and wherein the extract is defined in each case by a strip of this image that has a lateral position in this image corresponding to the location coordinate value assigned to the respective column, and controlling the pixels of the pixel matrix in such a way that each of the columns has written into it the extract calculated for this column.

This results in a situation that is comparable to what is known as "integral imaging" and in which a viewer can perceive the reproduced scene three-dimensionally autostereoscopically in a relatively large region in front of the screen irrespective of the exact position of the viewer within this region and also, at least within very wide limits, irrespective of a distance of the viewer from the screen, more specifically from a perspective that corresponds to the actual position of the viewer within the specified region and that, as the viewer moves, changes with this position. Due to the described control of the pixels, a light field that is very similar to the light field that the reproduced scene would cause in reality is produced in the region in front of the screen. The eyes of the viewer here, within the specified region, see contributions of a large number of the above-mentioned extracts and accordingly, as is exactly the case in this respect with integral imaging, which is known per se, a mixture of different parallel projections, wherein this mixture corresponds exactly to a realistic perspective, in which each eye sees one of two central projections, which differ from one another by a parallax shift corresponding to the distance between the eyes.

By contrast with integral imaging, which is known per se, the proposed method however can be implemented with a conventional multiview display, which—due to the above-mentioned correlation, in at least some multiview displays, between period length of the optical grid and the lateral offset of adjacent pixel columns—does not meet the particular geometric conditions that are required of a display suitable for integral imaging. These displays are specifically configured such that they have a certain number of channels, on each of which one of a corresponding number of parallel projections—reproduced completely and not only in extracts—is reproduced, wherein each of these channels—by contrast with the screen described here—emits as a group of parallel light beams.

The disclosure enables an image reproduction corresponding to integral imaging and associated with corresponding image depth and freedom of movement for the viewer(s) with the use of a conventional multiview display, which can be selected as necessary from a large number of commercially obtainable cost-effective screens. The disclosure enables use in different applications, for example for image reproduction in computer games or in CAD methods. The 3D scene to be reproduced can of course also be moved, such that the images or extracts thereof calculated and written into the columns of the pixel matrix may be moved images accordingly.

The disclosed autostereoscopic screen with which image information can be reproduced in the described manner is advantageous accordingly. This autostereoscopic screen has a pixel matrix with a plurality of pixels, an optical grid arranged in front of the pixel matrix, and a control unit for controlling the pixel matrix, wherein the pixels of the pixel matrix are arranged such that they form a plurality of columns arranged equidistantly side by side with a column direction that is vertical or inclined relative to a vertical, wherein the optical grid has a group of strip-shaped structures oriented parallel to the columns and arranged equidistantly side by side and gives light originating from the pixels at least one defined propagation plane, which is spanned from a defined horizontal propagation direction and the column direction, wherein a period length of the optical grid, said period length being defined by a lateral offset of adjacent strip-shaped structures, is greater by a factor $n \times L_n/(L_n+a)$ than a lateral offset of the directly adjacent columns, wherein "a" denotes an effective distance between the pixel matrix and the optical grid, $L_n$ denotes a nominal viewing distance of the autostereoscopic screen, and n denotes an integer greater than two, and wherein the control unit is configured to carry out the following steps:

calculating or evaluating an assignment that assigns an angle value and a location coordinate value to each of the specified columns, wherein the angle value is defined as a measure for an angle between a horizontal reference direction and the horizontal propagation direction or one of the horizontal propagation directions which is or are given to the light originating from the pixels of the respective column by the optical grid, and wherein the location coordinate value specifies a position, in the lateral direction, of the respective column or of the strip-shaped structure of the optical grid, through which the light originating from the pixels of this column falls, for each of the columns calculating an extract of an image by image synthesis, wherein this image is a parallel projection of a 3D scene to be reproduced having a projection direction that is defined by the angle corresponding to the angle value assigned to the respective column, and wherein the extract is defined in each case by a strip of this image that has a lateral position in this image corresponding to the location coordinate value assigned to the respective column, and controlling the pixels of the pixel matrix in such a way that each of the columns has written into it the extract calculated for this column.

In some embodiments, the control unit is configured, when calculating the extracts, to determine brightness values of image points of the extracts and to write the extracts into the columns of the pixel matrix by controlling the pixels forming the respective column using the brightness values determined for the image point of the respective extract. Of course, the pixel matrix here may comprise pixels of different primary colours—typically red, green and blue pixels—which can be controlled accordingly with colour-dependent brightness values and of which, in some embodiments, three can be combined to form a coloured or colour-neutral pixel group. The pixel matrix can be provided for example by a liquid-crystal screen or an LED screen or a plasma screen. In turn, the optical grid may be, for example, a lens grid or a slot grid, wherein the strip-shaped structures can be provided by cylinder lenses or cylinder lens-like lenses or by transparent slots.

The calculation of the extracts may thus include the determination of brightness values of image points of the extracts, wherein the extracts are written into the columns of the pixel matrix by controlling the pixels forming the respective column using the brightness values determined for the image points of the respective extract. The image synthesis used to calculate the extracts, also referred to as rendering, can be performed in a manner similar to that in the case of integral imaging, which is known per se. To this end, conventional rendering methods can thus be used, wherein, compared with conventional applications of such rendering methods or image synthesis methods, there is no additional computing outlay because the relatively large number of parallel projections do not have to be calculated in full, but rather it is sufficient when the specified extracts, i.e. relatively small parts of these parallel projections, are calculated In some embodiments, the angle values can be assigned to the columns such that a number of even far more than n different angle values is assigned to the different columns, such that the extracts calculated for the columns are calculated from a corresponding number of more than n different parallel projections with a corresponding number of more than n different projection directions. Thus the specified angles can be determined in accordance with the geometric properties of the screen with extremely high accuracy. In the case of the proposed auto stereoscopic screen as well, the specified assignment can thus assign a number of more than n different angle values to the different columns, such that the control unit is configured to calculate the extracts for the different columns of the pixel matrix from a corresponding number of more than n different parallel projections with a corresponding number of more than n different projection directions. The more accurate are the angle values determined and the more finely graduated are the intermediate values allowed, the better will be the image quality that can be provided here. The determination of the angle values is an easily solved problem with regard to beam geometry, irrespective of the required accuracy. Of course, the pixels have a finite extension, which in some circumstances is not negligible. The light originating from the pixels and falling through the optical grid is also normally always slightly laterally fanned due to the finite lateral extension of the strip-shaped structures. In order to determine the specified propagation planes and propagation directions, a point lying centrally in the respective pixel—for example a centroid point of the pixel—should then be used as a starting point, wherein the propagation direction is defined such that the propagation plane defined by the propagation direction and by the column direction lies centrally in a light fan originating from the respective pixel.

The projection directions of the parallel projections, of which the extracts are calculated for the different columns, are expediently selected such that they each enclose an angle with a reference projection direction common for all of these parallel projections, which angle is exactly the same size as the angle that corresponds to the angle value assigned to the respective column or that is given by multiplying the latter angle by a proportionality factor common for all of these parallel projections. For example, a direction corresponding to a viewing direction of the scene from the front can be selected as reference projection direction. The reference projection direction should be selected in a manner depending on and corresponding to the above-mentioned horizontal reference direction, which in the case specified by way of example can be selected as arranged perpendicularly on a plane spanned by the pixel matrix or by the optical grid. If the angle between the projection direction and the reference projection direction is selected to be exactly the same size as the angle corresponding to the angle value assigned to the respective column, a three-dimensional presentation that is particularly true to nature is provided, wherein reproduced objects remain still as the viewer moves. If, by contrast, a proportionality factor deviating from one is selected, this may result in the effect that reproduced scenes or objects, when the viewer moves, appear also to rotate in accordance with the movement, or appear to rotate against this movement. The projection direction can be considered as a virtual camera viewing direction which would have to be provided in order to capture the respective image.

Accordingly, the control unit of the proposed autostereoscopic screen can be configured to calculate the extracts for the different columns such that the projection directions of the parallel projections, of which the extracts are those in question, each enclose an angle with a reference projection direction common for all of these parallel projections, which angle is exactly the same size as the angle that corresponds to the angle value assigned to the respective column or that is given by multiplying the latter angle by a proportionality factor common for all of these parallel projections.

In some embodiments, the optical grid gives the light originating from the pixels of each column or at least the pixels of some of the columns a finite number of different propagation planes with accordingly different horizontal propagation directions, which are provided as a result of the fact that the light falls through different strip-shaped structures of the optical grid. In order to determine the angle value assigned to the respective column, a propagation direction can be selected from these propagation directions, which selected propagation direction is defined in that the light originating from the pixels of this column and falling with this propagation direction through the optical grid falls into a predefined cohesive observation space in front of the screen. In some embodiments of the autostereoscopic screen, the aforementioned assignment is such that the angle value assigned to the respective column is defined by a selected propagation direction from these propagation directions, wherein this selected propagation direction is defined in that the light originating from the pixels of this column and falling with this selected propagation direction through the optical grid falls into a predefined cohesive observation space in front of the screen. The specified observation space expediently lies here within a region that is illuminated by the light that originates from a group of n directly adjacent columns running centrally through the pixel matrix and falls through one of the strip-shaped structures of the optical grids that is located exactly centrally in front of this group of columns.

In some embodiments of the method and the autostereoscopic screen, the angle values are assigned to the columns such that the columns are distributed between groups of in each case n or also n+1 or at least n−1 directly adjacent columns, within which the angle values assigned to the columns of the respective group differ from column to column by an angle difference identical for all groups, wherein the angle values assigned to the columns of each of these groups each span an interval that is at least (n−1) times as large as the specified angle difference. In some embodiments, most of the specified groups comprise exactly n columns, whereas some groups are formed from just n−1 columns or in some circumstances also from n+1 columns. By changing the division of the columns between the specified groups, the specified observation space, from which the reproduced 3D scene is visible autostereoscopically in good quality, can be either brought closer to the screen—at the cost of a width of this observation space at greater distance from the screen—or can be widened at a greater distance from the screen—at the cost of a greater minimum distance.

The 3D scene, which is reproduced in the described manner, is visible with relatively good quality and can be perceived three-dimensionally autostereoscopically within the specified observation space. However, defects reducing the image quality may appear at edges of this observation space, which defects, in some embodiments, are visible as strips running in the column direction—for example at an incline—and arranged parallel side by side. Causes of these defects include a crosstalk between adjacent columns of pixels, in which extracts of images are reproduced, which correspond to parallel projections of the 3D scene with relatively significantly different projection directions. With the described control, extracts of parallel projections of the 3D scene within most cases only slightly differing projection directions are reproduced on the columns of pixels arranged side by side. However, a much greater projection direction jump—i.e. a greater jump between the angle values assigned to these columns—occurs in the opposite direction with each approximately $n^{th}$ column jump, and may lead to the specified defect. A measure will be outlined hereinafter that allows these defects at least to be mitigated. Averaged intensity values are written into some of the columns. This preferably concerns in each case one of the directly adjacent columns into which extracts from parallel projections of significantly deviating projection direction are to be written, that is to say the columns of the pixel matrix in which the specified greater projection direction jumps occur. An average is taken between contributions of the two parallel projections with the projection directions corresponding to the right and the left image of the specified observation space in front of the screen.

In order to do this, at least some of the columns arranged at an edge of one of the previously specified groups of columns may additionally also be assigned to the adjacent group of columns adjoining this edge of the group, and two angle values may be assigned accordingly to each of these columns, said angle values being defined by two of the horizontal propagation directions, wherein two extracts are calculated accordingly for each of these columns on the basis in each case of one of these two angle values, and wherein the pixels of these columns are each controlled with an averaged brightness value, which is given by averaging brightness values defined by these two extracts. The control unit may thus be configured in this case to calculate accordingly for each of the aforementioned columns two extracts on the basis in each case of one of these two angle values and to control the pixels of these columns with an averaged brightness value provided by averaging brightness values defined by these two extracts.

The specified averaged brightness values, with which the pixels of the columns are controlled, to which two angle values are assigned and for which two extracts are calculated, are, in some embodiments, each determined as the sum from a first brightness value weighted with a first weighting factor and a second brightness value weighted with a second weighting factor, wherein the first brightness value is defined by a first of the two extracts for the respective pixel and the second brightness value is defined by the second of these two extracts for the same pixel. Of course, it is not ruled out that both weighting factors may easily each have a value of 0.5. However, the first weighting factor and the second weighting factor, also for each of the columns of pixels in question, may each in some circumstances be defined as being dependent on how closely to a lateral delimitation of the specified observation space the light originating from the pixels of this column and falling with the propagation direction defined by the respective angle value through the optical grid falls into the observation space. An even further improved suppression of the mentioned defects can thus be achieved. More specifically, the first weighting factor defined for one of the columns should be smaller, the closer to the closest lateral delimitation of the observation space the light originating from the pixels of this column and falling with the propagation direction defined by the first angle value through the optical grid falls into the observation space. The second weighting factor defined for the respective column should accordingly be smaller, the closer to the lateral delimitation of the observation space the light originating from the pixels of this column and falling with the propagation direction defined by the second angle value through the optical grid falls into the observation space. Here, the second weighting factor is, in some embodiments, greater, the smaller is the first weighting factor. The weighting factors can be defined for example such that a sum from the first weighting factor and the second weighting factor for each of the columns of pixels in question adds up in each case to one. The averaged brightness values and the weighting factors defined therefor, in some circumstances in a variable manner, can be calculated and determined in the described manner by the control unit, which can be programmed accordingly for this purpose.

Figure 2:
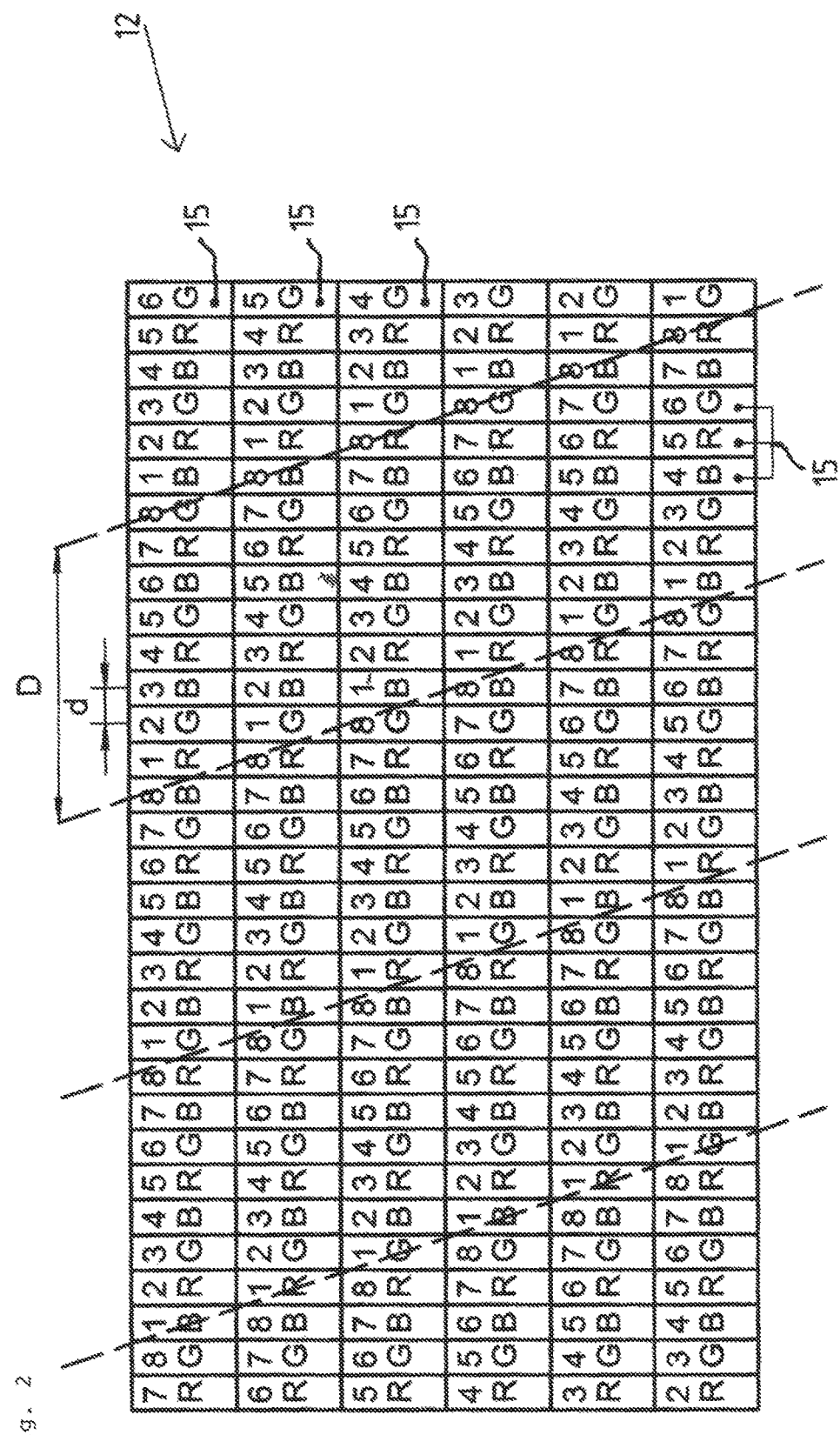
FIG. 2 shows a view from the front of a detail of a pixel matrix of this screen, FIG. 3 in an illustration corresponding to FIG. 1, which shows a plan view of the same screen with a desired beam path corresponding to what is known as "integral imaging"

FIG. 1 illustrates an autostereoscopic screen 11, which has a pixel matrix 12, an optical grid 13 arranged in front of the pixel matrix 12, and a control unit 14 for controlling the pixel matrix 12. FIG. 2 shows a detail of the pixel matrix 12. Like features are provided in the different figures with like reference signs and will not be explained again in conjunction with each of the figures. As can be seen in FIG. 2, the pixel matrix 12 has a plurality of pixels 15, wherein the pixels 15 of the pixel matrix 12 form a plurality of columns arranged equidistantly side by side with a column direction that is inclined relative to a vertical.

FIG. 2 here shows a division of the pixels 15 between eight sub-quantities, which is provided with a conventional use of a screen 11 of this type. With this division the specified columns of pixels 15 are distributed in cyclical order from left to right over the sub-quantities. The sub-quantities are numbered from 1 to 8, wherein in FIG. 2 the pixels 15 are each provided in an upper part with a number from 1 to 8 corresponding to the number of the sub-quantity to which the respective pixel 15 is assigned. The inclined course of the columns can be seen in particular as a result.

The pixels 15 are pixels 15 of three different primary colours, which in FIG. 2 are denoted by R for red, G for green or B for blue in accordance with their respective primary colour. Here, three pixels 15 arranged one above the other in the column direction supplement one another to form a colour-neutral pixel group or a pixel group suitable for reproduction of practically any arbitrary colour. Of course, modifications are also conceivable in which more than three colours belong to a pixel group or in which the columns have a vertical course, wherein the pixels are then to be arranged re-sorted over the pixel matrix 12 in accordance with the different primary colours. The pixel matrix 12 may be, for example, a liquid-crystal screen, i.e. an LCD, or an LED screen formed by a light-emitting diode matrix, or also a plasma screen.

The optical grid 13 has a group of strip-shaped structures oriented parallel to the columns of pixels 15 and arranged equidistantly side by side, which structures are indicated in FIG. 2 by dashed lines and give the light originating from the pixels 15 at least one defined propagation plane. The propagation planes are given here are by a fan-shaped propagation of the light originating from each of the pixels 15 and falling through the structures of the optical grid 13 and are each spanned from a defined horizontal propagation direction and the column direction. A period length D of the optical grid 13, said period length being defined by a lateral offset of adjacent strip-shaped structures, is in some exemplary embodiments greater by a factor $8 \times L_n/(L_n+a)$ than a lateral offset d of the directly adjacent columns, wherein a denotes an effective distance between the pixel matrix 12 and the optical grid 13, and $L_n$ denotes a nominal viewing distance of the autostereoscopic screen 11. D thus is not quite as large as 8 times the lateral pixel distance d. With modifications of the described screen 11, in particular in the case of a pixel matrix 12 of higher resolution, a larger integer could of course also be provided instead of the number 8.

The optical grid 13 is a lens grid, wherein the strip-shaped structures are given by cylinder lenses. With modifications of the described screen 11, the specified structures could also be given by transparent slots, and the optical grid 13 could be provided accordingly by a slot grid.

With the mentioned conventional use of the screen 11 in a manner known per se, one of eight stereoscopic fields of image is reproduced on each of the eight sub-quantities of pixels 15, which fields of image are complementary to one another in the sense that they all reproduce the same scene and correspond to other viewing directions or camera positions, such that they supplement one another in pairs to form a stereo image of this scene with different parallax shifts. On account of the described geometric properties of the screen 11, such a control of the pixel matrix 12 results in eight viewing zones arranged side by side with rhombic outline at the minimal viewing distance $L_n$ in front of the screen 11, which viewing zones are numbered from 1 to 8 in FIG. 1 and from each of which one of the fields of image is visible. The field of image that is reproduced on the sub-quantity assigned the same number, in accordance with the numbering introduced in conjunction with FIG. 2, as the respective viewing zone is visible from each of the viewing zones. A lateral offset of the directly adjacent viewing zones corresponds approximately to a distance between the eyes of an average pair of eyes, i.e. approximately 65 mm. Any viewer who is placed in front of the screen such that their eyes are within a region spanned by the viewing zones, moreover in two different viewing zones, can thus perceive the scene in a manner appearing to be three-dimensional. However, the space from which the scene with this type of control can be perceived autostereoscopically with satisfactory image quality is very limited and is restricted to an environment surrounding the region spanned by the eight viewing zones, which surrounding environment is very narrow in particular in respect of the distance from the screen 11.

Figure 3:
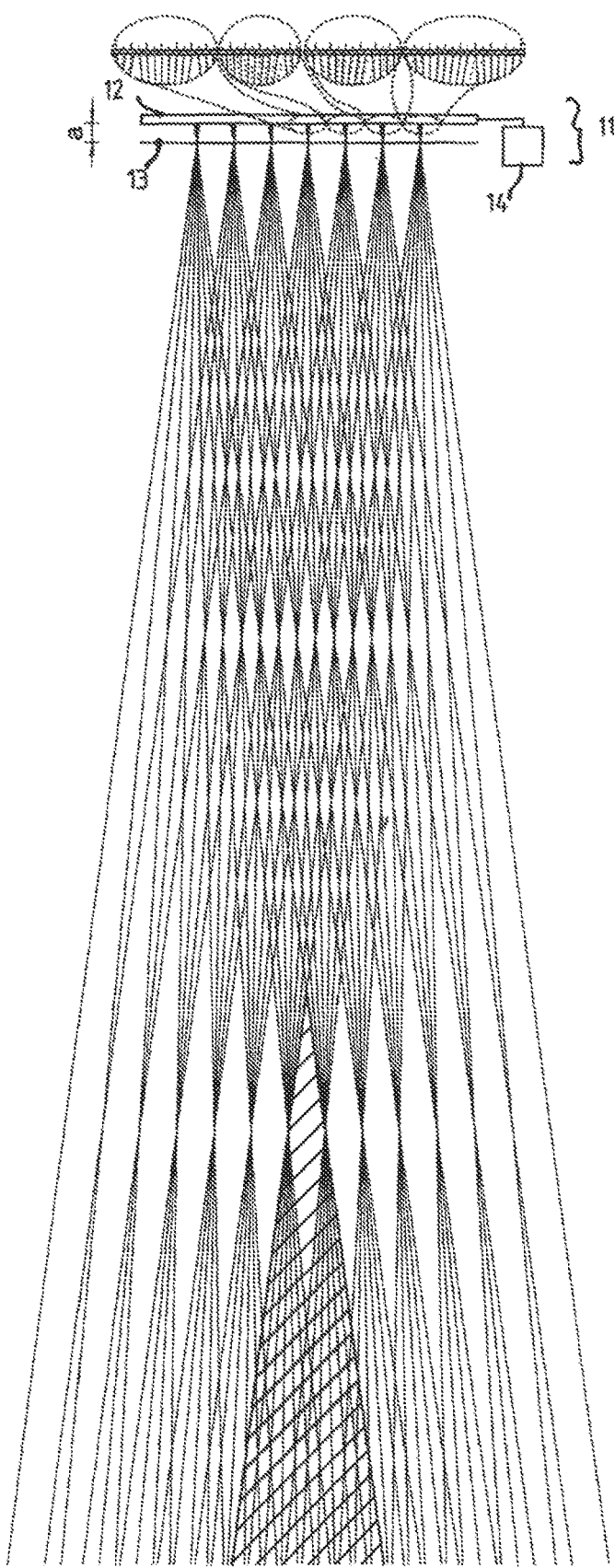

A completely different type of image reproduction is known under the name "integral imaging" or "one-dimensional integral imaging". A similarly structured screen with pixel matrix and optical grid is used for this purpose, however the optical grid of said screen has a period length that, where n is an integer, corresponds precisely to n times a lateral offset of adjacent pixel columns. Similarly, n sub-quantities of pixels are now formed on the pixel matrix of this screen, wherein one of n parallel projections of the 3D scene to be reproduced is reproduced on each of these sub-quantities, wherein these parallel projections differ from one another by slightly different projection directions. The special geometry of screens provided for integral imaging now leads to the fact that the light originating from an individual sub-quantity of the sub-quantities of pixels falls in each case in parallel beams or fans through the optical grid in a manner as is illustrated in FIG. 3 by way of example for n=8. This results in a relatively large observation space in front of the screen, which is hatched in FIG. 3, i.e. a light field that is very similar to the light field that would be caused by the reproduced 3D scene in reality. A viewer who is placed such that their eyes lie within this observation space, which is very extensive in particular in depth, can thus perceive the 3D scene three-dimensionally, wherein said viewer sees a mixture of the different parallel projections since the eyes of the viewer see contributions of different parallel projections from various regions of the screen. The viewer sees the 3D scene in each case from a perspective that corresponds to the actual position of the viewer within the observation space and that, as the viewer moves, changes with this position.

Figure 4:
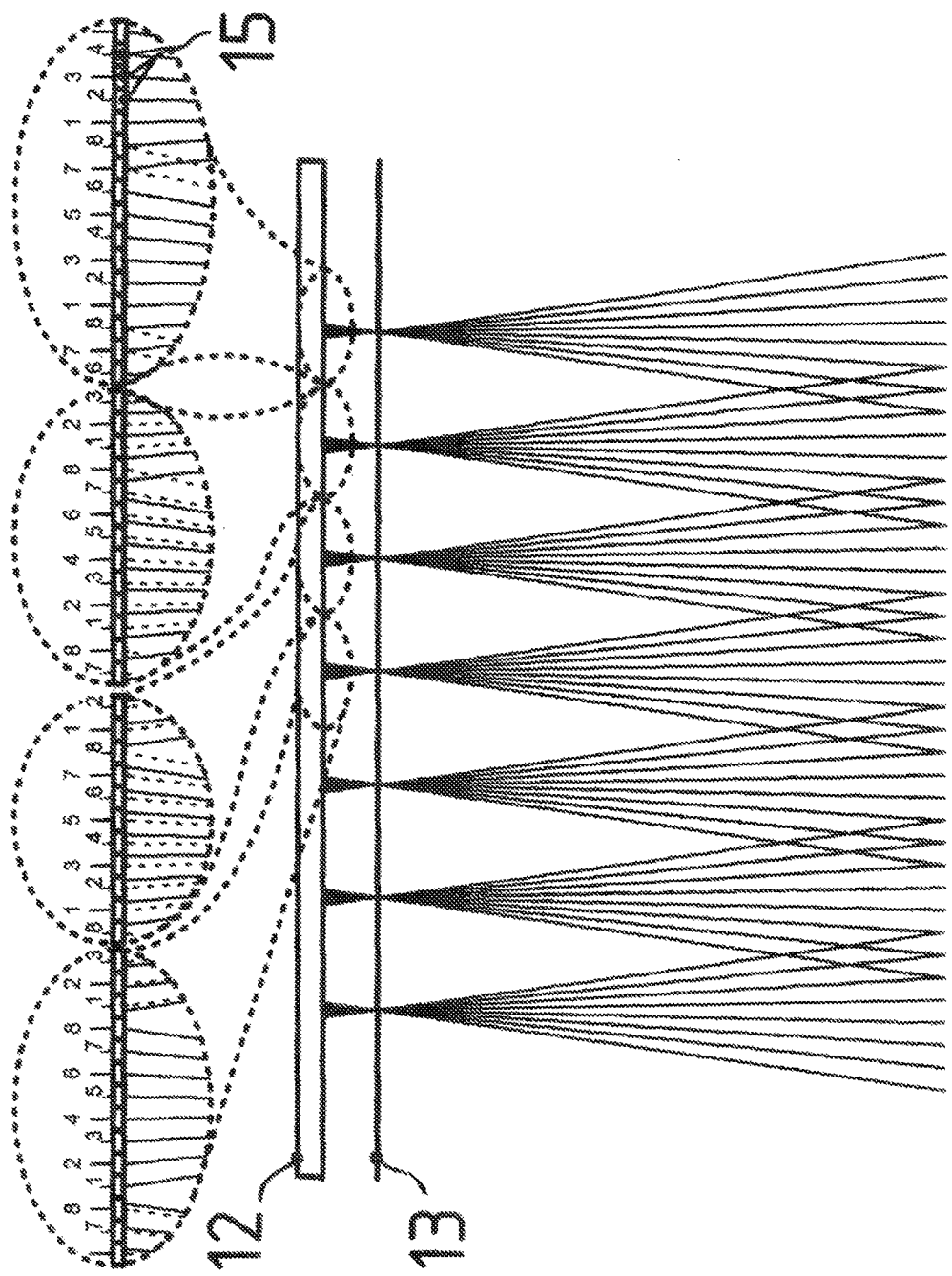
FIG. 4 shows an enlarged detail from FIG. 3.

The enlargement shown in FIG. 4 of a detail from FIG. 3 illustrates why this type of image reproduction is not easily possible with the present screen 11. There, details of a pixel row are shown enlarged once more for some selected regions of the pixel matrix 12. The pixels 15 are each denoted there by one of the numbers 1 to 8, which corresponds to the numbering from FIG. 2 and consequently to the division into sub-quantities with control in accordance with the manner shown in FIG. 1. The corresponding portions of the actual beam paths from FIG. 1 are shown in these enlargements by solid lines. By contrast, the beams of the beam field shown in FIG. 3 are indicated there by dashed lines. Here, it can be seen that these beams—which, similarly to all beams reproduced in the figures, are each intended to reproduce a middle line of the corresponding finitely extended light beams—do not start centrally from the pixels 15, but from points that are laterally displaced by small amounts with respect to midpoints of the pixels 15. This is a result of the above-described relationship $D=[8 \times L_n/(L_n+a)] \times d$ and is the reason why the type of image reproduction described in the previous paragraph cannot be readily transferred to the present screen 11.

Another method for reproducing image information will now be carried out with the screen 11 described here, which leads to an effect comparable to integral imaging and that will be explained initially with reference to FIG. 5 and FIG.

6. To this end, a special assignment is first performed, in which an angle value and a location coordinate value are assigned to each of the specified columns, wherein the angle value is defined as a measure for an angle between a horizontal reference direction and the horizontal propagation direction or one of the horizontal propagation directions that is or are given to the light originating from the pixels 15 of the respective column by the optical grid 13, and wherein the location coordinate value specifies a position, in the lateral direction, of the respective column or of the strip-shaped structure of the optical grid 13, through which the light originating from the pixels 15 of the respective column falls. The location coordinate value can be defined for this purpose as a coordinate of a point of intersection of the respective column or strip-shaped structure with a coordinate axis oriented in the row direction of the pixel matrix 12, relative to this coordinate axis. The angle values assume far more than 8 different values. For illustration, in FIG. 6 the pixels 15 visible in the sections illustrated there in an enlarged manner are each denoted with an angle value that is assigned to the column to which the respective pixel 15 belongs. The angle values are scaled here such that eight directly adjacent columns of pixels 15 running centrally through the pixel matrix 12 are assigned the angle values 1, 2, 3, 4, 5, 6, 7 and 8. By contrast, the angle values also assume intermediate values in other regions of the pixel matrix 12.

The control unit 14 is initially configured to calculate the described assignment of angle values and location coordinates or, should this assignment already be stored at another point, to evaluate this assignment.

Building on this, an extract of an image is calculated in each case by an image synthesis by a corresponding programming of the control unit 14 for each of the columns, wherein this image is in each case a parallel projection of a 3D scene to be reproduced having a projection direction defined by the angle corresponding to the angle value assigned to the respective column, and wherein the extract is defined in each case by a strip of this image that in this image has a lateral position corresponding to the location coordinate value assigned to the respective column. A conventional rendering method can be used for this purpose, wherein, compared with conventional applications of such rendering methods or image synthesis methods, there is no additional computing outlay because the relatively large number of parallel projections do not have to be calculated in full, but rather only the specified strip-shaped extracts, i.e. relatively small parts of these parallel projections, are calculated. The starting point can be constituted in each case by date that define the 3D scene in the conventional manner and that the used rendering method or the applied image synthesis processes in a manner known per se in order to obtain the required parallel projections or images defined by parallel projections, even if only in extracts in each case.

Lastly, the pixels 15 of the pixel matrix 12 are controlled by the control unit 14 configured for this purpose, such that each of the columns has written into it the extract calculated for this column. Here, the calculation of extracts implies the determination of brightness values of image points of the extracts, wherein the extracts are written into the columns of the pixel matrix 12 by controlling the pixels 15 forming the respective column using the brightness values determined for the image points of the respective extract and defined depending on the respective primary colour.

Figure 5:
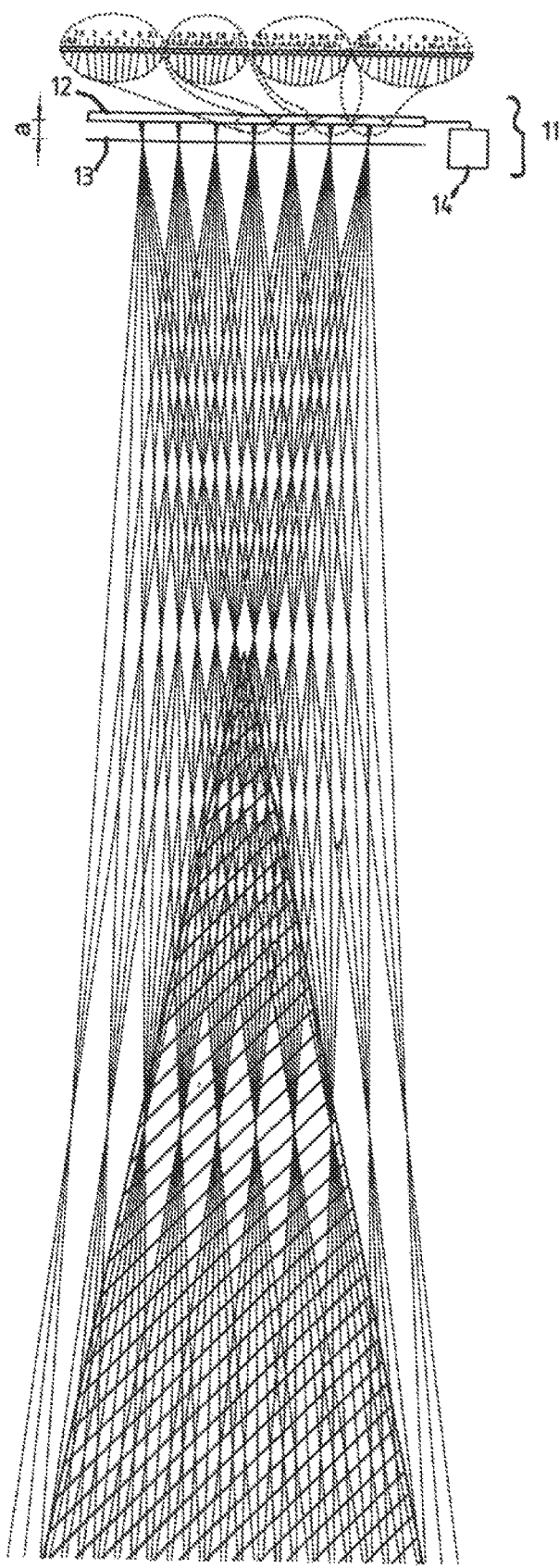
FIG. 5 shows a schematic view of the autostereoscopic image from FIG. 1 and the viewer space in front of this screen with a different type of control of the screen, according to embodiments described in the disclosure.

As a result of this control the eyes of a viewer who remains with their eyes within the observation space illustrated in a hatched manner in FIG. 5 sees contributions of a large number of the above-mentioned extracts and accordingly—exactly as in the case of the previously described integral imaging—a mixture of different parallel projections, wherein this mixture corresponds in each case to precisely one realistic perspective, wherein the perspectives visible for the two eyes differ from one another by a parallax shift corresponding to the distance between the eyes. The screen thus conveys to the viewer at any arbitrary location within the observation space a three-dimensional impression of the reproduced 3D scene in a manner comparable to integral imaging. Here, the observation space extends up to any viewing distances and is much wider in a rearward direction than the region spanned by the viewing zones from FIG. 1, in which region the viewer must stay in the case of conventional control in order to be able to see an image with three-dimensional effect with satisfactory quality.

Figure 6:
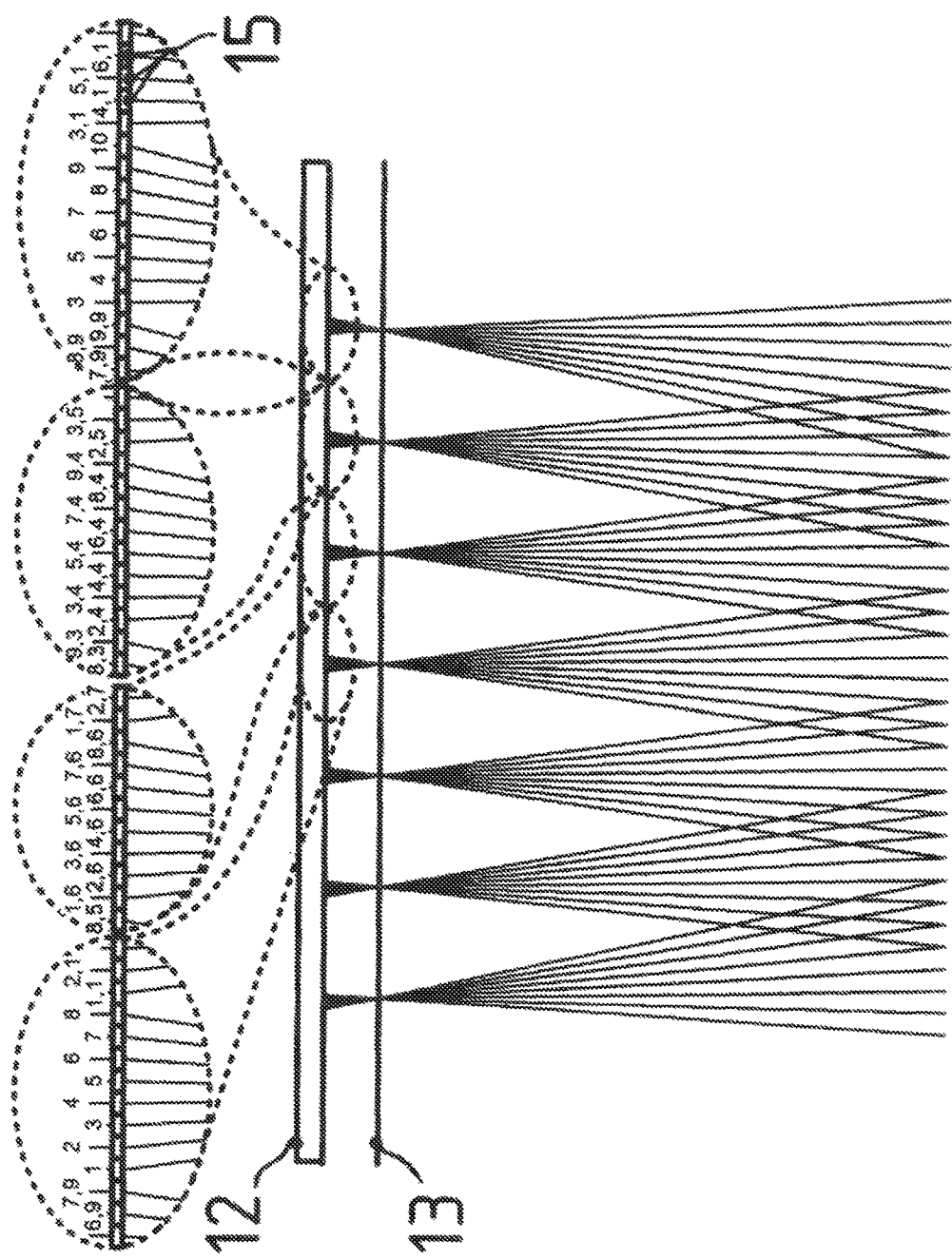
FIG. 6 shows an enlarged detail from FIG. 5, according to embodiments described in the disclosure, FIG. 7 in an illustration corresponding to FIG. 5, which shows a view of the same screen with a modified type of control, according to embodiments described in the disclosure.

Since the angle values as illustrated in FIG. 6 are calculated so accurately and in a finely graduated manner and are assigned accordingly to the columns such that a number of far more than eight different angle values is assigned to the different columns, the extracts calculated for the columns are also calculated from an accordingly large number of far more than eight different parallel projections having a corresponding number of far more than eight different projection directions.

The projection directions of the parallel projections, of which extracts are calculated for the different columns, are selected here such that they each enclose an angle with a reference projection direction common for all of these parallel projections, which angle is exactly the same size as the angle corresponding to the angle value assigned to the respective column. In modifications the projection directions may also be selected in some circumstances such that they each enclose an angle with the reference projection direction, which angle is given by multiplying the angle corresponding to the angle value assigned to the respective column by a proportionality factor common for all of these parallel projections and deviating from one. A direction corresponding to a selected viewing direction of the 3D scene is selected as reference projection direction, wherein the described reproduction then causes the viewer to then see the 3D scene on the screen 11 in accordance with precisely this viewing direction when said viewer looks at the screen 11 from the above-mentioned horizontal reference direction. The horizontal reference direction here is the direction corresponding to the angle value zero.

Due to the fact that the optical grid 13 has a plurality of strip-shaped structures—thus a plurality of cylinder lenses arranged side by side or in one of the specified modifications a plurality of slots arranged side by side—through which the light originating from the pixels 15 can fall, the optical grid gives the light originating from the pixels 15 of each of the columns not only one propagation plane, but a finite number of different propagation planes having accordingly different horizontal propagation directions. As a result, the described measures for controlling the pixel matrix also allow a certain margin when determining the angle values to be assigned to the columns. This margin can be utilised in order to shift the observation space within certain limits and in particular also to move it closer to the screen 11, as shown in FIG. 7 and FIG. 8.

In order to determine the angle value assigned to the respective column, a propagation direction is selected from the different possible horizontal propagation directions defined by the different propagation planes, which selected propagation direction is defined in that the light originating from the pixels 15 of this column and falling with this propagation direction through the optical grid 13 falls into the predefined cohesive observation space in front of the screen. As shown by a comparison of FIGS. 5 and 7, the observation space can be selected differently here. Here, the observation space illustrated in each case in a hatched manner in FIGS. 5 and 7 lies in each of the cases shown here within a region that is illuminated by the light that originates from the aforementioned group of eight directly adjacent columns of pixels 15 running centrally through the pixel matrix 12 and that falls through one of the strip-shaped structures of the optical grid 13 that lies exactly centrally in front of this group of columns. Correspondingly to that shown in FIG. 6, in FIG. 8, which shows an enlarged detail of FIG. 7, the angle values assigned with a control according to FIG. 7 are specified for some selected columns of pixels 15. With the selected scaling the pixels 15 or columns of pixels 15 shown by way of example are consequently assigned angle values between 1 and 12.

The angle values are assigned here to the columns such that the columns are divided between groups of in each case eight or also nine or at least seven directly adjacent columns, within which the angle values assigned to the columns of the respective group differ from column to column by an angle difference identical for all groups, which with the scaling selected here is exactly one. The angle values that are assigned to the columns of each of these groups here each span an interval that in each case for most of these groups is at least eight times as great as the specified angle difference, but at least seven times as great.

Figure 7:
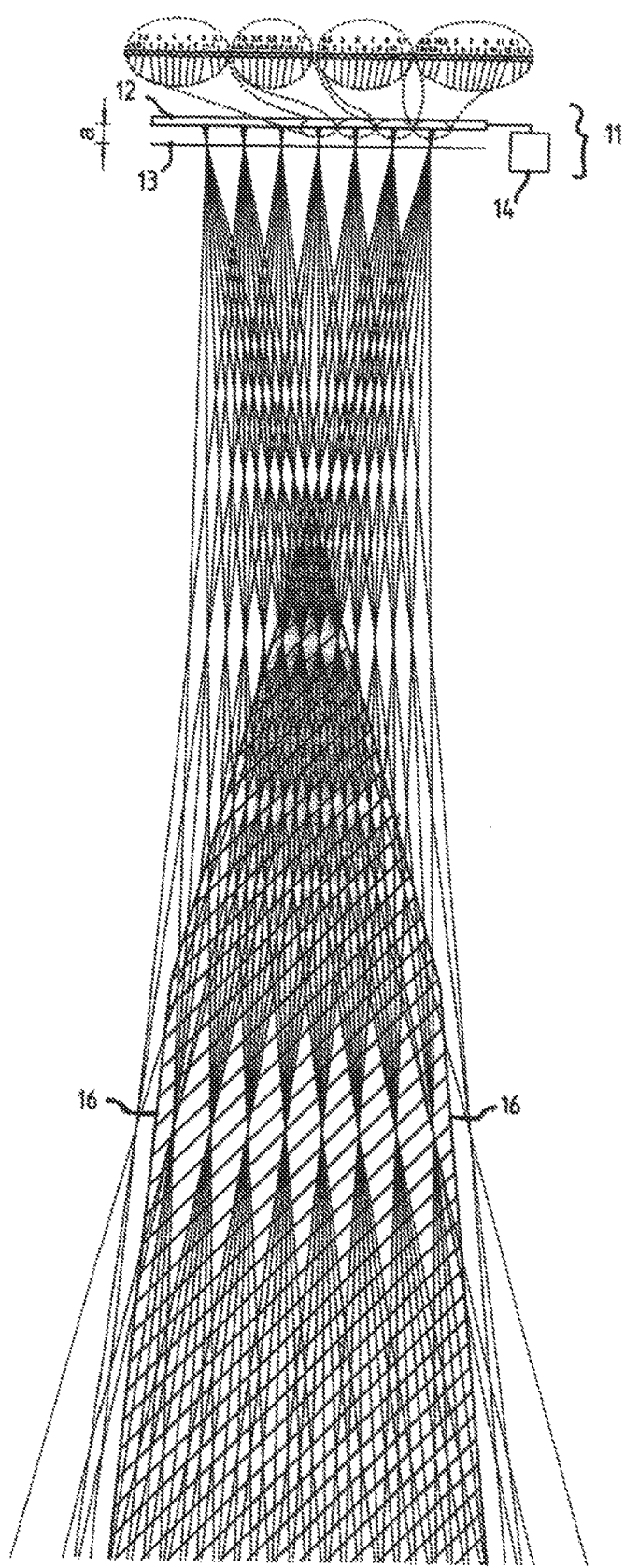
Figure 8:
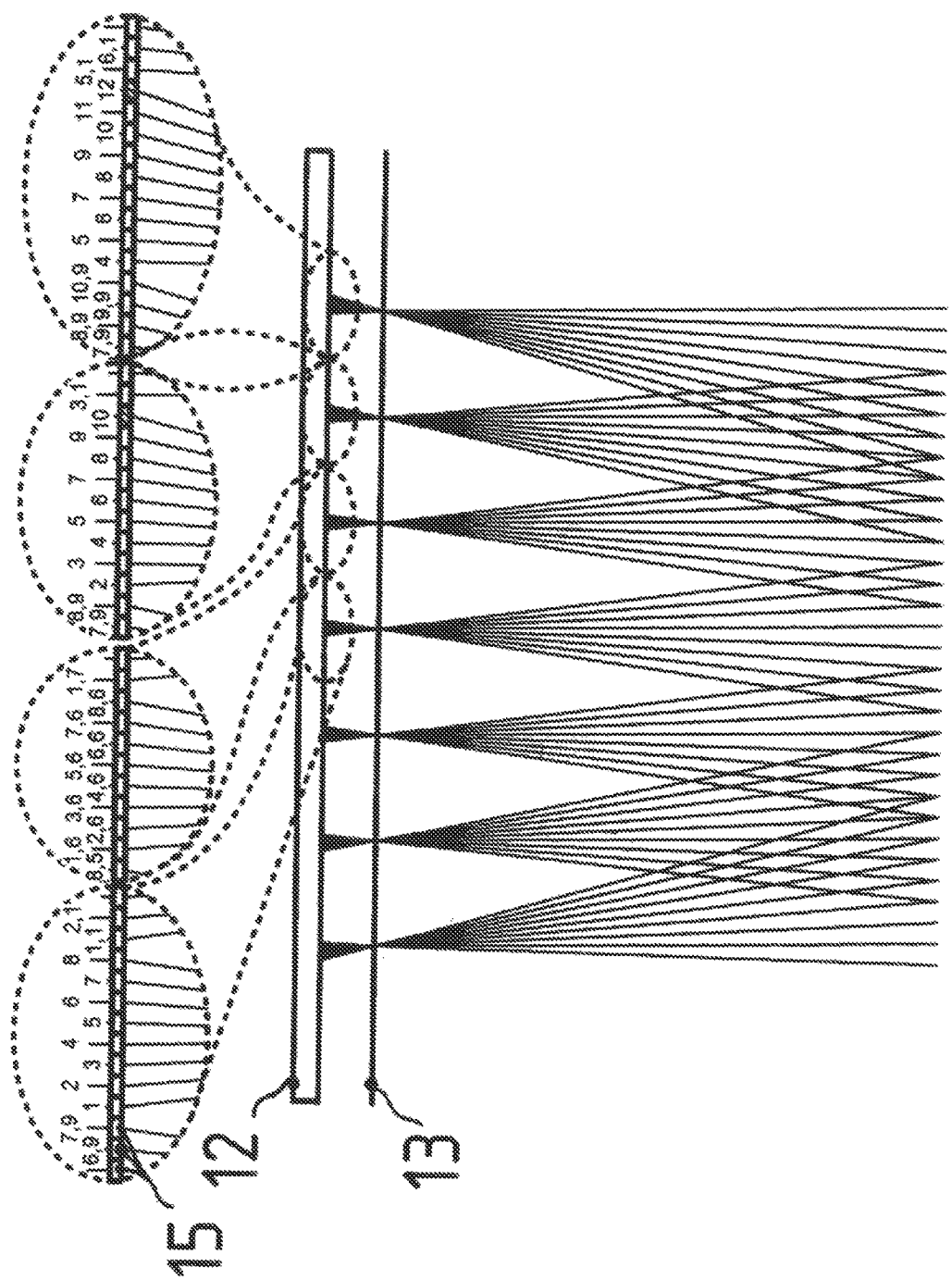
FIG. 8 shows an enlarged detail from FIG. 7, according to embodiments described in the disclosure, and FIG. 9 in an illustration corresponding to FIG. 8 shows a further modification of the control of the screen, according to embodiments described in the disclosure.

A comparison of FIGS. 5 and 7 shows how the observation space, by changing the division of the columns between the specified groups either can be brought closer to the screen 11 in the manner shown in FIG. 7—at the cost of a width of the observation space at greater distance from the screen—or can be widened at greater distance from the screen 11 in the manner shown in FIG. 5—at the cost of a greater minimum distance.

Figure 9:
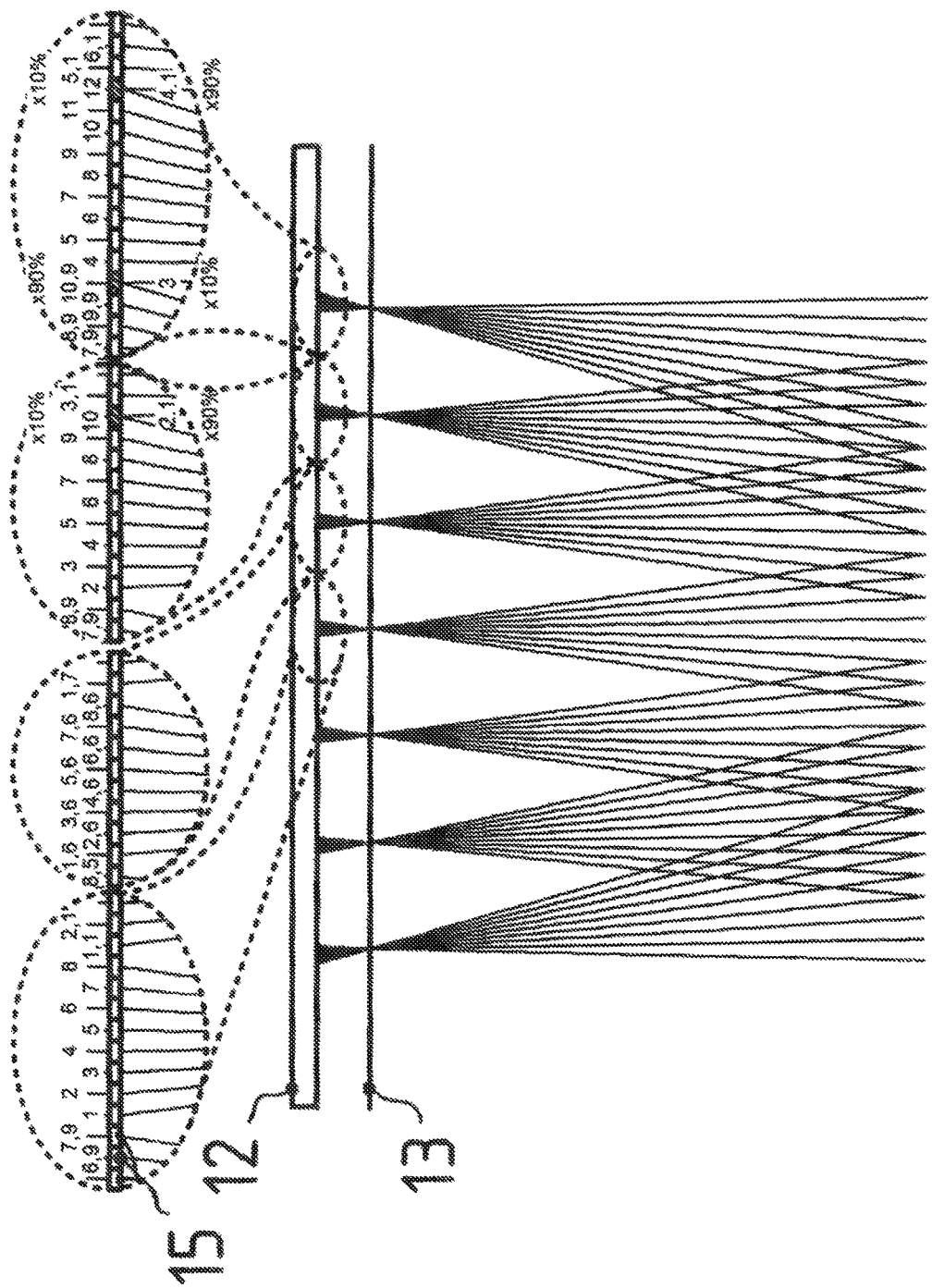

A modification of the control of the pixel matrix 12 described on the basis of FIGS. 7 and 8 is illustrated in FIG. 9 in an illustration corresponding to FIG. 8. With this modified control, at least some of the columns arranged at an edge of one of the specified groups of columns are additionally also assigned to the adjacent group of columns adjoining this edge of the group. These columns, of which three can be seen in the once more enlarged details from FIG. 9 and of which the pixels 15 visible there are illustrated in a hatched manner in FIG. 9, are accordingly assigned two angle values, which are defined by two of the horizontal propagation directions. These two angle values for the cases visible in FIG. 9 in the scaling selected there are in one case 2.1 and 10, in another case 3 and 10.9, and in a third case 4.1 and 12. This double assignment is made here precisely at the columns of which the position with the selected or desired observation space is arranged precisely such that the light originating from there leaves the optical grid 13 through two adjacent structures of the optical grid 13, in each case exactly or almost exactly along one of two lateral delimitations 16 of the observation space. Depending on the propagation direction of two possible propagation directions with which the light falls further into the observation space, one or other of these propagation directions, as indicated in FIG. 9, can be assigned a greater or a small weighting, i.e. a greater or smaller weighting factor. Two extracts are now calculated for each of these selected columns on the basis in each case of one of the two angle values assigned to the respective column, wherein the pixels 15 of these columns are each controlled with an averaged brightness value. Here, this averaged brightness value is determined by averaging brightness values defined by these two extracts, wherein these brightness values are weighted with the specified weightings or weighting factors, which supplement one another to give 100%. As a result of this measure the observation space can be shifted practically continuously and can be brought closer to the screen 11 as necessary.

The specified averaged brightness values, with which the pixels 15 of the columns are controlled, to which two angle values are assigned and for which two extracts are calculated, are thus in this case determined as the sum of a first brightness value weighted with a first weighting factor and a second brightness value weighted with a second weighting factor, wherein the first brightness value is the brightness value defined by a first of the two extracts for the respective pixel 15, whereas the second brightness value is that defined by the second of these two extracts for the same pixel 15. By a corresponding programming of the control unit 14, the first weighting factor and the second weighting factor, for each of the columns of pixels 15 in question, are each defined as being dependent on how closely to a lateral delimitation 16 of the observation space illustrated in a hatched manner in FIG. 7 the light originating from the pixels 15 of the respective column and falling with the propagation direction defined by the respective angle value through the optical grid 13 falls into the observation space. This results in an image reproduction that has particularly few defects. The first weighting factor defined for one of the columns here is smaller, the closer to the closest lateral delimitation 16 of the observation space the light originating from the pixels 15 of this column and falling with the propagation direction defined by the first angle value through the optical grid 13 falls into the observation space, and is greater, the further removed from the closest lateral delimitation 16 of the observation space the light originating from the pixels 15 of this column and falling with the propagation direction defined by the first angle value through the optical grid 13 falls into the observation space, or—expressed otherwise—the further the corresponding light beams thus lie within the observation space. The second weighting factor defined for the respective column is accordingly defined so as to be greater, the further distanced from the closest lateral delimitation 16 of the observation space the light originating from the pixels 15 of this column and falling with the propagation direction defined by the second angle value through the optical grid 13 falls into the observation space—i.e. the further the corresponding light beams having this propagation direction lie within the observation space. Conversely, the second weighting factor defined for the respective column is defined to be smaller, the closer to the lateral delimitation 16 of the observation space the light originating from the pixels 15 of this column and falling with the propagation direction defined by the second angle value through the optical grid 13 falls into the observation space. The second weighting factor is thus greater, the smaller is the first weighting factor, and vice versa.

The invention claimed is:

1. A method for reproducing image information on an autostereoscopic screen, which has a pixel matrix with a plurality of pixels and also an optical grid arranged in front of the pixel matrix, wherein the plurality of pixels of the pixel matrix are arranged such that they form a plurality of columns arranged equidistantly side by side with a column direction that is vertical or inclined relative to a vertical direction, and wherein the optical grid has a group of strip-shaped structures oriented parallel to the plurality of columns and arranged equidistantly side by side and gives light originating from the plurality of pixels at least one defined propagation plane, which is spanned from a defined horizontal propagation direction and the column direction, wherein a period length (D) of the optical grid, the period length being defined by a lateral offset of adjacent strip-shaped structures, is greater by a factor $n \times L_n/(L_n+a)$ than a lateral offset (d) of directly adjacent columns, wherein "a" denotes an effective distance between the pixel matrix and the optical grid, $L_n$ denotes a nominal viewing distance of the autostereoscopic screen, and n denotes an integer greater than two, wherein the method comprises:

assigning an angle value and a location coordinate value to each column of the plurality of columns, wherein the angle value is defined as a measure for an angle between a horizontal reference direction and the defined horizontal propagation direction which is given to the light originating from the plurality of pixels of a respective column by the optical grid, and wherein the location coordinate value specifies a position, in a lateral direction, of the respective column;

for each column of the plurality of columns, calculating an extract of an image by image synthesis, wherein the image is a parallel projection of a three dimensional (3D) scene to be reproduced having a projection direction that is defined by the angle corresponding to the angle value assigned to the respective column, and wherein the extract is defined by a strip of the image that has a lateral position in the image corresponding to the location coordinate value assigned to the respective column; and controlling the plurality of pixels of the pixel matrix in such a way that each column of the plurality of columns has written into it the extract calculated for the respective column.

2. The method according to claim 1, wherein the calculating the extract of the image for each column of the plurality of columns includes a determination of brightness values of image points of the extract, wherein the extract is written into the respective column by controlling the plurality of pixels forming the respective column using the brightness values determined for the image points of the extract.

3. The method according to claim 1, wherein a number of more than n different angle values is assigned to the plurality of columns, such that the extract calculated for each column of the plurality of columns is calculated from a corresponding number of more than n different parallel projections with a corresponding number of more than n different projection directions.

4. The method according to claim 3, wherein the optical grid gives the light originating from the plurality of pixels of at least some columns of the plurality of columns a finite number of different propagation planes in accordance with different horizontal propagation directions, which are provided as a result of the light originating from the plurality of pixels of the respective column falling through different strip-shaped structures of the optical grid, wherein, in order to determine the angle value assigned to the respective column, a propagation direction is selected from the different horizontal propagation directions, the selected propagation direction being defined such that the light originating from the plurality of pixels of the respective column and falling with the selected propagation direction through the optical grid falls into a predefined connected observation space in front of the autostereoscopic screen.

5. The method according to claim 4, wherein the predefined connected observation space lies within a region that is illuminated by light that originates from a group of n directly adjacent columns of pixels running centrally through the pixel matrix and falls through one of the strip-shaped structures of the optical grid, the one of the strip-shaped structures of the optical grid being located exactly in front of the group of n directly adjacent columns.

6. The method according to claim 4, wherein the angle value is assigned to each column of the plurality of columns such that the plurality of columns are distributed between groups of in each case n or n+1 or n−1 directly adjacent columns, wherein the angle value assigned to each column of the distributed columns of each of the groups differs from column to column by an angle difference identical for all of the groups, wherein angle values assigned to the plurality of columns of each of the groups each span an interval that is at least (n−1) times as large as the angle difference.

7. The method according to claim 6, wherein at least some of the plurality of columns arranged at an edge of one of the groups of n or n+1 or n−1 directly adjacent columns are additionally assigned to an adjacent group of columns adjoining the edge of the one of the groups of n or n+1 or n−1 directly adjacent columns, and two angle values are assigned accordingly to the at least some of the plurality of columns additionally assigned to the adjacent group of columns, the two angle values being defined by two of the horizontal propagation directions, wherein two extracts are calculated accordingly for each column of the at least some of the plurality of columns additionally assigned to the adjacent group of columns based on in each case one angle value of the two angle values, and wherein the plurality of pixels of the at least some of the plurality of columns additionally assigned to the adjacent group of columns are each controlled with an averaged brightness value, which is given by averaging brightness values defined by the two extracts.

8. The method according to claim 7, wherein the averaged brightness value, with which each pixel of the plurality of pixels of the at least some of the plurality of columns additionally assigned to the adjacent group of columns is controlled, to which the two angle values are assigned and for which the two extracts are calculated, is determined as a sum from a first brightness value weighted with a first weighting factor and a second brightness value weighted with a second weighting factor, wherein the first brightness value is defined by a first extract of the two extracts and the second brightness value is defined by a second extract of the two extracts.

9. The method according to claim 1, wherein the projection direction of the parallel projection, of which the extract is calculated for each column of the plurality of columns, encloses an angle with a reference projection direction, the reference projection direction being common for all of the plurality of columns, which enclosed angle has a same size as the angle corresponding to the angle value assigned to the respective column or is given by multiplying the angle corresponding to the angle value assigned to the respective column by a proportionality factor common for all of the plurality of columns.

10. An autostereoscopic screen, comprising:
a pixel matrix with a plurality of pixels;
an optical grid arranged in front of the pixel matrix; and
a controller configured to control the pixel matrix, wherein:
the plurality of pixels of the pixel matrix are arranged such that they form a plurality of columns arranged equidistantly side by side with a column direction that is vertical or inclined relative to a vertical direction;

the optical grid has a group of strip-shaped structures oriented parallel to the plurality of columns and arranged equidistantly side by side and gives light originating from the plurality of pixels at least one defined propagation plane, which is spanned from a defined horizontal propagation direction and the column direction;

a period length (D) of the optical grid, the period length being defined by a lateral offset of adjacent strip-shaped structures, is greater by a factor $n \times L_n/(L_n+a)$ than a lateral offset (d) of directly adjacent columns, where "a" denotes an effective distance between the pixel matrix and the optical grid, $L_n$ denotes a nominal viewing distance of the autostereoscopic screen, and n denotes an integer greater than two; and the controller further configured to:

calculate or evaluate an assignment that assigns an angle value and a location coordinate value to each column of the plurality of columns, wherein the angle value is defined as a measure for an angle between a horizontal reference direction and the defined horizontal propagation direction which is given to the light originating from the plurality of pixels of a respective column by the optical grid, and the location coordinate value specifies a position, in a lateral direction, of the respective column;

for each column of the plurality of columns, calculate an extract of an image by image synthesis, wherein the image is a parallel projection of a three dimensional (3D) scene to be reproduced having a projection direction that is defined by the angle corresponding to the angle value assigned to the respective column, and the extract is defined by a strip of the image that has a lateral position in the image corresponding to the location coordinate value assigned to the respective column; and control the plurality of pixels of the pixel matrix in such a way that each column of the plurality of columns has written into it the extract calculated for the respective column.

11. The autostereoscopic screen according to claim 10, wherein the controller is further configured to, when calculating the extracts, determine brightness values of image points of the extract and to write the extract into the respective column by controlling the plurality of pixels forming the respective column using the brightness values determined for the image points of the extract.

12. The autostereoscopic screen according to claim 10, wherein the assignment assigns a number of more than n different angle values to the plurality of columns, such that the controller is further configured to calculate the extract for each column of the plurality of columns of the pixel matrix from a corresponding number of more than n different parallel projections with a corresponding number of more than n different projection directions.

13. The autostereoscopic screen according to claim 12, wherein the optical grid gives the light originating from the plurality of pixels of each column of the plurality of columns or from the plurality of pixels of some columns of the plurality of columns a finite number of different propagation planes in accordance with different horizontal propagation directions, which are provided as a result of the light originating from the plurality of pixels of the respective column falling through different strip-shaped structures of the optical grid, wherein the angle value assigned to the respective column is defined by a propagation direction selected from the different horizontal propagation directions, wherein the selected propagation direction is defined in that the light originating from the plurality of pixels of the respective column and falling with the selected propagation direction through the optical grid falls into a predefined connected observation space in front of the autostereoscopic screen.

14. The autostereoscopic screen according to claim 13, wherein the predefined connected observation space lies within a region that is illuminated by light that originates from a group of n directly adjacent columns of pixels running centrally through the pixel matrix and falls through one of the strip-shaped structures of the optical grid that is located in front of the group of n directly adjacent columns.

15. The autostereoscopic screen according to claim 13, wherein the angle value is assigned to each column of the plurality of columns such that the plurality of columns are distributed between groups of in each case n or n+1 or n−1 directly adjacent columns, wherein the angle value assigned to each column of the distributed columns of each of the groups differs from column to column by an angle difference identical for all of the groups, wherein angle values assigned to the plurality of columns of each of the groups each span an interval identical for all of the groups that is at least (n−1) times as large as the angle difference.

16. The autostereoscopic screen according to claim 15, wherein at least some of the plurality of columns arranged at an edge of one of the groups of n or n+1 or n−1 directly adjacent columns are additionally assigned to an adjacent group of columns adjoining the edge of the one of the groups of n or n+1 or n−1 directly adjacent columns, and two angle values are assigned to the at least some of the plurality of columns additionally assigned to the adjacent group of columns, the two angle values being defined by two of the horizontal propagation directions, wherein the controller is further configured to calculate two extracts accordingly for each column of the at least some of the plurality of columns additionally assigned to the adjacent group of columns based on in each case of one angle value of the two angle values and to control the plurality of pixels of the at least some of the plurality of columns additionally assigned to the adjacent group of columns in each case using an averaged brightness value, which is given by averaging brightness values defined by the two extracts.

17. The autostereoscopic screen according to claim 16, wherein the controller is further configured to determine the averaged brightness value for each pixel of the plurality of pixels of the at least some of the plurality of columns additionally assigned to the adjacent group of columns, to which the two angle values are assigned, as a sum from a first brightness value weighted with a first weighting factor and a second brightness value weighted with a second weighting factor, wherein the first brightness value is defined by a first extract of the two extracts and the second brightness value is defined by a second extract of the two extracts.

18. The autostereoscopic screen according to claim 10, wherein the controller is further configured to calculate the extract for each column of the plurality of columns such that the projection direction of the parallel projection, the extract of which is calculated for each column of the plurality of columns, encloses an angle with a reference projection direction, the reference projection direction being common for all columns of the plurality of columns, which enclosed angle has a same size as the angle that corresponds to the angle value assigned to the respective column or that is given by multiplying the angle corresponding to the angle value assigned to the respective column by a proportionality factor common for all columns of the plurality of columns.

19. The autostereoscopic screen according to claim 10, wherein the optical grid is a lens grid or a slot grid, wherein the strip-shaped structures are given by cylinder lenses or by transparent slots.

20. The autostereoscopic screen according to claim 10, wherein the pixel matrix is given by a liquid-crystal screen or a light emitting diode (LED) screen or a plasma screen.

* * * * *